United States Patent [19]
Krisher

[11] Patent Number: 5,624,343
[45] Date of Patent: Apr. 29, 1997

[54] PINION MATE THRUSTWASHER

[75] Inventor: James A. Krisher, Fort Wayne, Ind.

[73] Assignee: Dana Corporation, Toledo, Ohio

[21] Appl. No.: 365,200

[22] Filed: Dec. 28, 1994

[51] Int. Cl.$^6$ .................................................. F16H 48/08
[52] U.S. Cl. ........................... 475/160; 475/230; 384/358; 384/902; 411/534
[58] Field of Search ................................... 475/160, 230; 384/420, 368, 902; 411/155, 156, 160, 161, 162, 163, 428, 533, 534

[56] References Cited

U.S. PATENT DOCUMENTS

| | | | |
|---|---|---|---|
| 1,487,073 | 3/1924 | Nogrady | 475/160 |
| 1,616,627 | 2/1927 | Hunt | 475/230 |
| 1,795,570 | 3/1931 | Nilson | 411/156 X |
| 3,362,258 | 1/1968 | Thornton | 74/711 |
| 3,874,251 | 4/1975 | Lapitsky et al. | 475/230 |
| 4,084,450 | 4/1978 | Conroy | 74/713 |
| 4,125,026 | 11/1978 | Torii et al. | 475/230 |
| 4,136,582 | 1/1979 | Boor | 475/230 |
| 4,163,400 | 8/1979 | Fisher et al. | 475/230 |
| 4,978,329 | 12/1990 | Yasui et al. | 475/84 |
| 5,234,388 | 8/1993 | Nordkvist | 475/230 X |

FOREIGN PATENT DOCUMENTS

| | | | |
|---|---|---|---|
| 3721384 | 1/1989 | Germany | 384/420 |
| 58-178014 | 10/1983 | Japan | 384/420 |

*Primary Examiner*—Charles A. Marmor
*Assistant Examiner*—Nathan O. Jensen
*Attorney, Agent, or Firm*—Oldham & Oldham Co., LPA

[57] ABSTRACT

A differential gear assembly comprising a rotatable case, a spider having at least one shaft mounted on the case for rotation therewith, a pinion gear rotatably mounted on the shaft and a thrustwasher non-rotatably mounted on the shaft and disposed between the pinion gear and the case. The thrustwasher includes an outer, arcuate side disposed in opposition with the casing and an inner, substantially flat side disposed in opposition with an outward side of the pinion gear. The thrustwasher includes a central opening for accepting the shaft and substantially flat surfaces forming a portion of the opening and cooperating with longitudinally extending flats formed on the shaft for preventing rotation of the thrustwasher relative to the shaft. The thrustwasher is preferably made of powdered metal and includes lubrication channels which cooperate with lubrication passages formed in the shaft so as to permit the flow of lubricant from the shaft across the outward side of the pinion gear.

10 Claims, 3 Drawing Sheets

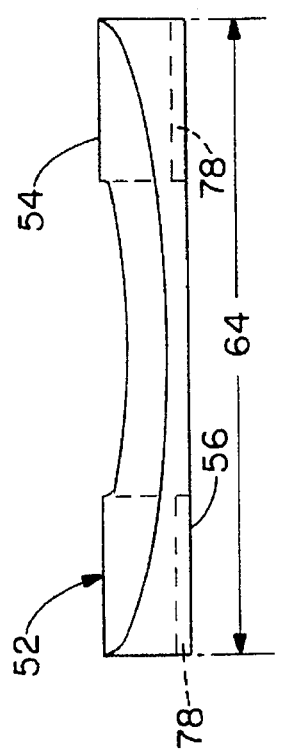
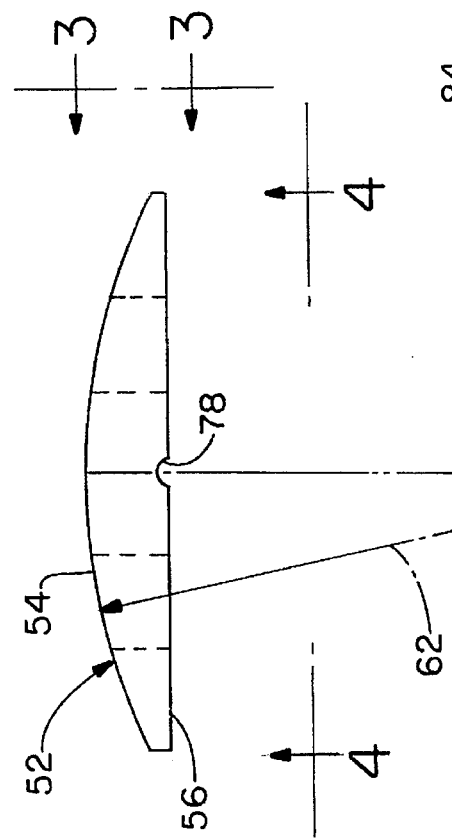
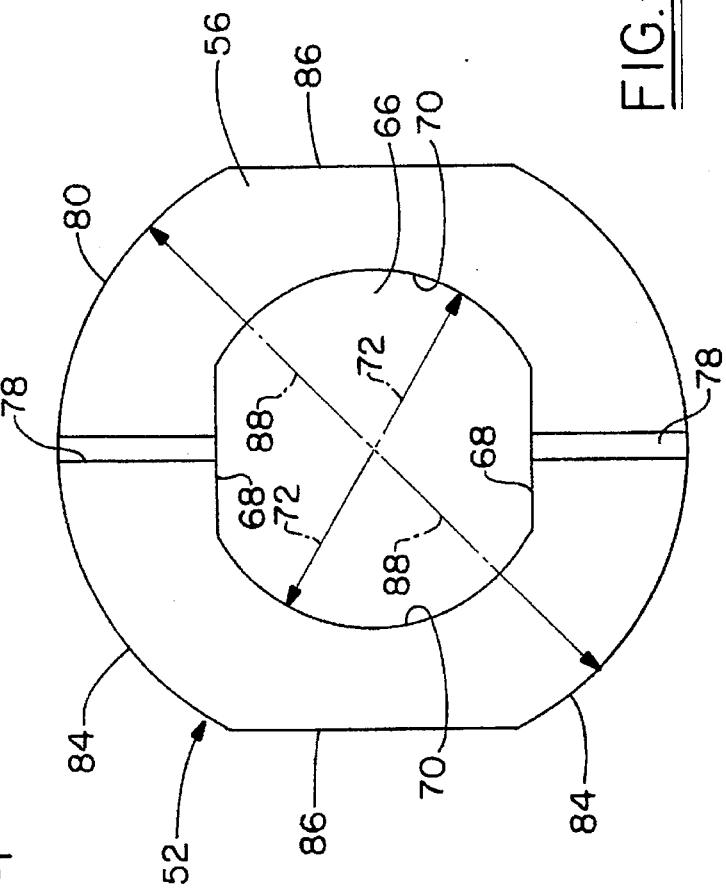

5,624,343

PINION MATE THRUSTWASHER

BACKGROUND OF THE INVENTION

1. Field of the Invention

The present invention relates to a thrustwasher and, more particularly, to a thrustwasher utilized in a differential gear assembly.

2. Related Art

Conventional differentials utilized in vehicle drivetrains typically include a face gear which is attached to the rotatable case and is driven by a pinion gear attached to a vehicle drive shaft. Known differentials further include pinion mate gears rotatably supported on stub shafts or pins secured within the rotatable case, with the pinion mate gears meshing with bevel side gears splined to the axle shafts.

Known differentials utilize a thrustwasher between the pinion mate gears and the differential case to minimize wear due to pinion mate rotation about the stub shafts mounted within the differential case. Historically, each thrustwasher has comprised a thin sheet metal stamping, heat-treated for wear resistance. In order to facilitate differential case assembly, the thrustwasher is usually designed with a spherical radius rather than a flat surface. Accordingly, a spherical radius is also required on the mating surfaces of the pinion mate gears and differential case. The spherical surfaces on the thrustwashers, pinion mate gears and differential case are relatively expensive to manufacture. Additionally, the use of thrustwashers having a spherical radius in a differential of the limited slip type, may compromise the required spatial envelope needed to accommodate the clutch pack of the limited slip differential for particular applications.

In view of the foregoing problems associated with known thrustwashers having a spherical radius, applicant's invention is herein presented.

SUMMARY

Accordingly, the present invention is directed to a differential gear assembly which includes a thrustwasher. According to a preferred embodiment the assembly further comprises a rotatable case, a spider comprising at least one shaft mounted to the case for rotation therewith, and a pinion gear rotatably mounted on the shaft. The thrustwasher is mounted on the shaft and disposed between the pinion gear and the case and includes an outer, arcuate side disposed in opposition with the casing and an inner, substantially flat side disposed in opposition with an outward side of the pinion gear. The thrustwasher further includes a central opening which accepts the shaft and a pair of inner, substantially flat surfaces extending between the outer and inner sides and forming a portion of the central opening. The pair of flat surfaces cooperate with a pair of longitudinal flats formed on the shaft for preventing rotation of the thrustwasher relative to the shaft.

A main advantage of the present invention is the reduction in complexity and cost of the thrustwasher, pinion mate gear and differential case due to the use of an arcuate outer side and a substantially flat inner side on the thrustwasher which interfaces with the case and pinion gear, respectively as compared to prior differential gear assemblies utilizing spherically shaped thrustwashers and pinion gears having complimentary shapes on mating surfaces.

BRIEF DESCRIPTION OF THE DRAWINGS

The aforementioned advantage, as well as the structural features and functions, and other advantages of the present invention, will become more apparent from the subsequent detailed description of the preferred embodiments taken in conjunction with the accompanying drawings, wherein:

FIG. 2 is an elevational view illustrating the thrustwasher shown in FIG. 1;

FIG. 3 is an elevational view taken along line 3—3 in FIG. 2;

FIG. 4 is a plan view taken along line 4—4 in FIG. 2 further illustrating the inner, substantially flat side of the thrustwasher shown in FIGS. 1-3.

DETAILED DESCRIPTION

Figure 1:
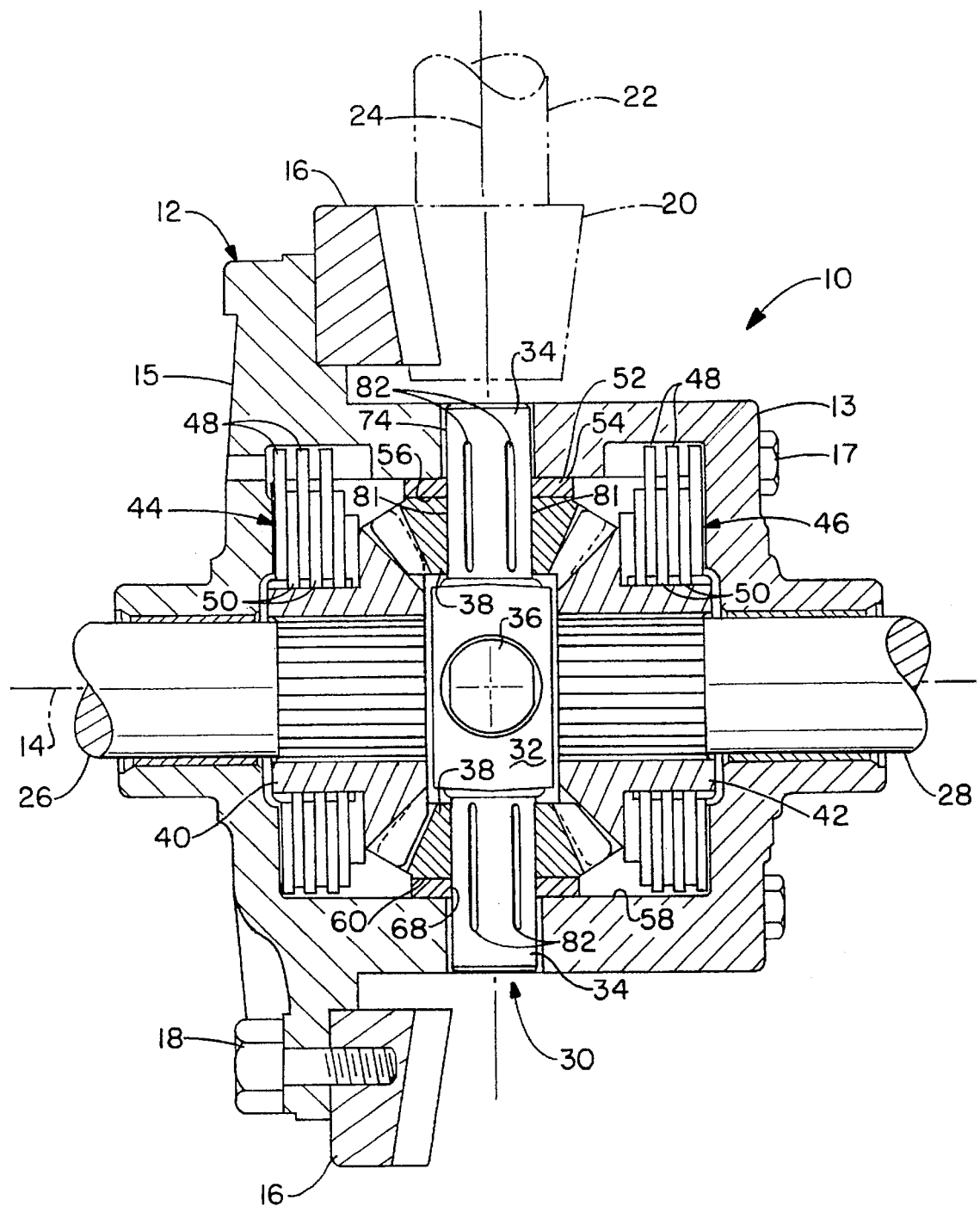
FIG. 1 is a cross-sectional view illustrating the differential gear assembly of the present invention.

Referring now to the drawings, FIG. 1 is a cross-sectional view illustrating a differential gear assembly 10 according to the present invention. In the illustrative embodiment found in FIG. 1, assembly 10 comprises a limited slip differential gear assembly which is effective for transferring torque from a drive shaft to each of a pair of coaxial axle shafts of a wheeled vehicle. Assembly 10 includes a case 12 which is rotatably mounted in an axle carrier (not shown) so as to permit rotation of case 12 about horizontal centerline axis 14. Case 12 is comprised of first and second portions, 13 and 15, which are fastened to one another by conventional means such as bolts 17. An annular face gear 16 is fastened to case 12 by bolts 18 (one shown). Face gear 16 meshingly engages drive pinion gear 20 which is rigidly affixed to an end of a vehicle drive shaft 22 having a longitudinal centerline axis 24. When pinion gear 20 is rotated about centerline axis 24 of shaft 22, face gear 16 and differential case 12 rotate about axis 14 of assembly 10. In this manner, torque is transferred from drive shaft 22 to axle shafts 26 and 28, which are rotatably mounted within case 12, in a conventional manner.

Differential gear assembly 10 further includes a spider 30 disposed within case 12. Spider 30 includes a center body portion 32 and a plurality of stub shafts extending radially outward from portion 32. In the embodiment illustrated in FIG. 1, spider 30 includes four stub shafts, with two being shown at 34, which are disposed in coaxial relationship with one another. Spider 30 further includes a second pair of stub shafts 36 which are coaxial with one another and disposed generally perpendicularly to stub shafts 34. A radially outward end of each stub shaft 34 and each stub shaft 36 is disposed in a bore formed in case 12. Accordingly, shafts 34 and 36 are rotatable about centerline 14 with case 10. A pinion gear 38 is rotatably mounted on each of the gears 34 and 36 and meshingly engages bevel side gears 40 and 42, in a conventional manner, with side gears 40 and 42 being rigidly affixed to axle shafts 26 and 26, respectively. Differential assembly 10 permits differential action between shafts 26 and 28 which is required when the associated vehicle is cornering. Additionally, differential gear assembly 10 resists wheel spin on bumpy roads and provides more pulling power when one wheel tries to slip due to contact with low coefficient surfaces such as ice, by automatically providing more torque to the wheel having the best traction. This is accomplished by the use of first and second clutches, indicated generally at 44 and 46, respectively. Clutches 44 and 46 are coaxially disposed about horizontal centerline axis 14 and each includes sets of interleaved friction plates or disks 48 and 50. The first set of plates 48, for clutches 44 and 46, are splined at an outer end to case 12, for rotation therewith. The second set of friction plates 50 of clutch 44 are splined at an inner end to bevel side gear 40, while the plates 50 of clutch 46 are similarly splined at an inner end to bevel side gear 42. Clutches 44 and 46 operate in a conventional manner, with plates 48 and 50 of clutch 44 or 46 being compressed together under selected conditions, so as to provide additional torque to the non-slipping wheel via the corresponding one of shafts 26 and 28.

During operation of differential gear assembly 10, substantial thrust loads may be imposed on pinion gears 38. Accordingly, a thrustwasher 52 is mounted on each stub shaft 34 and each stub shaft 36 and is disposed between the corresponding pinion gear 38 and case 12. The structural features and functions of thrustwasher 52 comprise the central features of the present invention and are illustrated in greater detail in FIGS. 2–4. Each thrustwasher 52 includes an outer, arcuate side 54 and an inner, substantially flat side 56. Thrustwashers 52 are mounted on shafts 34 and 36 so that the outer, arcuate sides 54 are disposed in opposition with a generally cylindrical, inner surface 58 of case 12 and with inner sides 56 disposed in opposition with an outward side 60 of the corresponding one of pinion gears 38. As shown in FIG. 2, arcuate side 54 is formed with a radius 62, with the shape of side 54 being complementary to the inner, generally cylindrical surface 58 of case 12. The shape of arcuate side 54 is constant throughout the width of thrustwasher 52 which extends into the plane of the paper of FIG. 2, which is denoted width 64 in FIG. 3. Accordingly, outer side 54 of thrustwasher 52 is depicted as a substantially straight line when viewed in FIG. 3, which corresponds to the orientation of thrustwasher 52 shown in FIG. 1. Thrustwasher 52 further includes a central opening 66 which accepts one of the shafts 34 or 36. A pair of substantially flat surfaces 68 form a portion of central opening 68 and extend between outer side 54 and inner side 56. The remainder of central opening 66 is bounded by arcuate surfaces 70, preferably formed by a radius 72, with surfaces 70 similarly extending between outer side 54 and inner side 56. Each of the shafts 34 and 36 include a pair of longitudinally extending flats 74. The pair of flat surfaces 68 of each thrustwasher 52 cooperates with the corresponding pair of flats 74 so as to prevent rotation of thrustwasher 52 relative to the corresponding one of shafts 34 and 36. It is desirable to prevent thrustwashers 52 from rotating relative to the corresponding ones of stub shafts 34 and 36 so as to avoid the unacceptable inward deflection of arcuate side 54 if such rotation were permitted.

Each thrustwasher 52 further includes a pair of lubrication channels 78 formed in the inner side 56 and extending between a peripheral edge 80 of thrustwasher 52 and one of the inner flat surfaces 68. As shown in FIG. 2, each channel 78 is preferably semi-circular, but other shapes may be utilized. Channels 78 cooperate with longitudinally extending lubrication passages 82 formed in shafts 34 and similar passages (not shown) formed in shafts 36 so as to permit the flow of lubricant through passages 82, into channels 78 and across the outward side 60 of the corresponding pinion gear 38. Thrustwasher 52 is preferably made of a powdered metal which allows thrustwasher 52 to be manufactured without any machining and further permits lubrication channel 78 to be incorporated without any additional cost. As best seen in FIG. 4, peripheral edge 80 is partially circular in shape, corresponding to portions 84, and is partially flat, corresponding to substantially flat portions 86. Circular portions 84 are formed by a radius 88 extending from the center of thrustwasher 52 and are included in the shape of peripheral edge 80 so as to minimize the material used in the manufacture or thrustwasher 52. Flat sides 86 are provided to correspond with the mating portions of the outward side 60 of the corresponding pinion gear 38, so that thrustwasher 52 does not overhang pinion gear 38.

Figure 5:
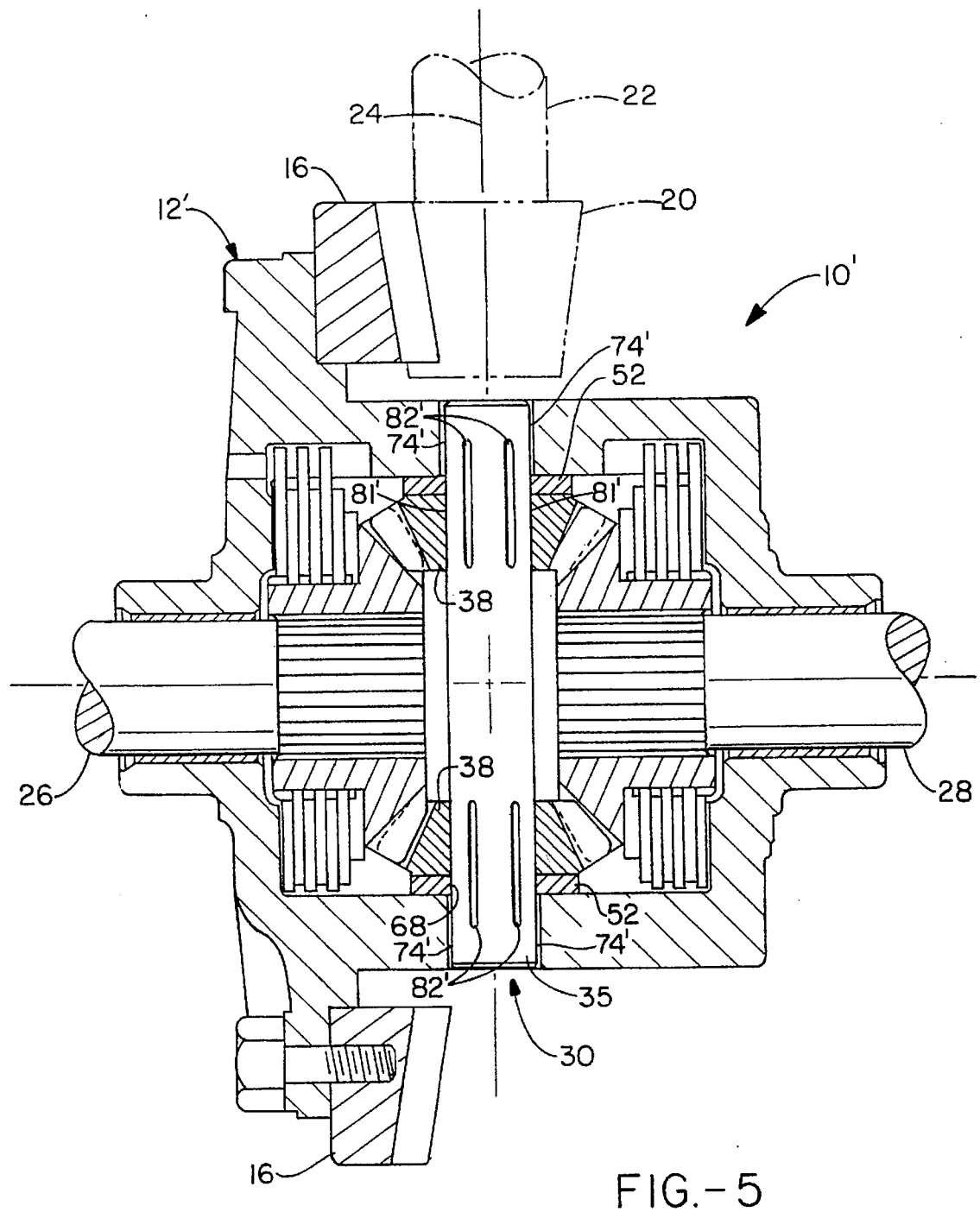
FIG. 5 is a cross-sectional view illustrating the differential gear assembly of the present invention according to an alternative embodiment.

Referring now to FIG. 5, an alternative differential gear assembly 10' is illustrated which is the same as gear assembly 10 with the following exceptions. Assembly 10' includes a case 12' which is made of a one-piece construction. Assembly 10 further includes a spider or cross-pin 30' which comprises a single shaft 35 having opposing ends disposed in bores formed in case 12'. A pair of pinion gears 38 are rotatably mounted on opposing ends of shaft 35. Inward movement of gears 38 along shaft 35 may be prevented by conventional C-rings (not shown) disposed in circumferentially extending grooves formed in shaft 35. A thrustwasher 52 is disposed between the outboard side 60 of each pinion gear 38 and case 12' and is constructed and functions the same as discussed previously with respect to assembly 10. Shaft 35 includes a pair of longitudinally extending flats 74', on each end, which cooperate with the inner flat surfaces 68 of the corresponding thrustwasher 52, so as to prevent rotation of thrustwasher 52 relative to shaft 35. Additionally, shaft 35 further includes longitudinally extending lubrication passages 82' which cooperate with lubrication channels 78 formed in thrustwashers 52 so as to permit the flow of lubricant through passages 82', into channels 78 and across the outward sides 60 of pinion gears 38. The remaining structural features and functions of assembly 10' are the same as those illustrated and discussed previously with respect to assembly 10.

The use of thrustwashers 52 in differential gear assemblies 10 and 10' provide the following advantages relative to prior conventional thrustwashers. Since thrustwasher 52 includes a substantially flat side 56 which interfaces with the outward side 60 of pinion gear 38, gear 38 is significantly simplified relative to prior pinion gears having outward spherical sides to mate with the spherically shaped prior thrustwashers. Accordingly, pinion gear 38 requires less material and less machining time and cost relative to prior pinion gears mating with spherically shaped thrustwashers. The use of arcuate side 54 and flat side 56, as compared to prior spherically shaped thrustwashers, also provides a more efficient utilization of the available space within case 12 or 12'. For a given outside diameter of case 12 or 12', the use of thrustwashers 52 permit the use of larger diameter friction disks for the limited slip clutches 44 and 46 thereby providing greater torque capacity for clutches 44 and 46. The cooperation between inner flat surfaces 68 on thrustwasher 52 and the longitudinally extending flats 74 formed on shafts 34 and 36, or 74' formed on shaft 35, prevents rotation of the thrustwashers 52 about the corresponding spider shaft thereby avoiding unnecessary and undesired wear of case 12 and 12'. The inclusion of lubrication channels 78 improves lubrication at the interface between the pinion gear and thrustwashers and at the interface between the pinion gear and spider shaft so as to reduce wear at these locations. Additionally, the use of thrustwashers 52 eliminates the undesirable potential mismatch occurring between the prior, spherically shaped thrustwashers and the mating spherically shaped outer side of prior pinion gears.

While the foregoing description has set forth the preferred embodiments in particular detail it must be understood that numerous modifications, substitutions and changes can be undertaken without departing from the true spirit and scope of the present invention as defined by the ensuing claims. For instance, although the thrustwashers of the present invention have been illustrated for use with differential gear assemblies of the limited slip type, the thrustwashers of the present invention may also be utilized with other conventional differential gear assemblies. The invention is therefore not limited to specific preferred embodiments as described, but is only limited as defined by the following claims.

What is claimed is:

1. A differential gear assembly comprising:

a rotatable case;

a spider comprising at least one shaft mounted on said case for rotation therewith;

a pinion gear rotatably mounted on said at least one shaft;

a thrustwasher mounted on said at least one shaft and disposed between said pinion gear and said case;

said thrustwasher having an outer, arcuate side disposed in opposition with said case and an inner, substantially flat side disposed in opposition with an outward side of said pinion gear;

wherein said thrustwasher further includes a central opening comprising a pair of inner, substantially flat surfaces extending between said outer and inner sides and forming a portion of said central opening, said pair of flat surfaces cooperating with a pair of longitudinally extending flats formed on said at least one shaft for preventing rotation of said thrustwasher relative to said shaft; and, wherein said thrustwasher has a peripheral edge which is at least partially circular and includes opposing flat surfaces which correspond to the mating portions of outer peripheral edges of said pinion gear.

2. The differential gear assembly as recited in claim 1, wherein, said thrustwasher includes at least one lubrication channel formed in said inner side and extending between a peripheral edge of said thrustwasher and one of said inner flat surfaces.

3. The differential gear assembly as recited in claim 2, wherein, said at least one shaft of said spider includes at least one lubrication passage formed therein, such that said lubrication channel of said thrustwasher cooperates with said at least one lubrication passage formed in said shaft so as to permit the flow of lubricant from said shaft across said outward side of said pinion gear.

4. The differential gear assembly as recited in claim 1, wherein, said thrustwasher is a made of a powdered metal.

5. The differential gear assembly as recited in claim 1, wherein, said spider includes four stub shafts and said assembly further includes a said pinion gear rotatably mounted on each of said stub shafts and a said thrustwasher disposed between an outward side of each of said pinion gears and said case.

6. The differential gear assembly as recited in claim 5, wherein, said case includes first and second portions fastened to one another.

7. The differential gear assembly as recited in claim 1, further comprising a pair of side gears rotatably mounted in said case and wherein said pinion gear meshingly engages each of said side gears.

8. The differential gear assembly as recited in claim 1, wherein, said case comprises a one-piece construction.

9. The differential gear assembly as recited in claim 8, wherein, said spider comprises a single shaft and said gear assembly further comprises a second pinion gear rotatably mounted on said shaft and a second thrustwasher disposed between an outward side of said second pinion gear and said case, said second thrustwasher having an outer, arcuate side disposed in opposition with said case and an inner, substantially flat side disposed in opposition with said outward side of said second pinion gear.

10. The differential assembly as recited in claim 1, wherein, said case includes an inner, generally cylindrical surface and said outer, arcuate side of said thrustwasher has a shape which is complementary to said cylindrical surface of said case.

* * * * *